(12) United States Patent
Yonezawa et al.

(10) Patent No.: US 12,248,961 B2
(45) Date of Patent: *Mar. 11, 2025

(54) INFORMATION PROCESSING APPARATUS, INFORMATION PROCESSING METHOD, AND PROGRAM FOR IDENTIFYING WHETHER AN ADVERTISEMENT IS POSITIONED IN ASSOCIATION WITH A PRODUCT

(71) Applicant: NEC Corporation, Tokyo (JP)

(72) Inventors: Yaeko Yonezawa, Tokyo (JP); Kaito Horita, Tokyo (JP); Akira Yajima, Tokyo (JP); Mizuto Sekine, Tokyo (JP); Yoshinori Ehara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,535

(22) Filed: Oct. 5, 2023

(65) Prior Publication Data
US 2024/0029104 A1   Jan. 25, 2024

Related U.S. Application Data

(63) Continuation of application No. 17/693,529, filed on Mar. 14, 2022, now Pat. No. 11,842,368, which is a
(Continued)

(30) Foreign Application Priority Data

Sep. 29, 2017 (JP) .................................. 2017-191792

(51) Int. Cl.
*G06Q 30/00* (2023.01)
*G06Q 10/087* (2023.01)
(Continued)

(52) U.S. Cl.
CPC ....... *G06Q 30/0246* (2013.01); *G06Q 10/087* (2013.01); *G06Q 30/0272* (2013.01); *G06T 7/70* (2017.01)

(58) Field of Classification Search
None
See application file for complete search history.

(56) References Cited

U.S. PATENT DOCUMENTS

| 2008/0306787 | A1 | 12/2008 | Hamilton | G06Q 10/0639 705/7.38 |
| 2009/0063307 | A1 | 3/2009 | Groenovelt | G06Q 10/087 705/28 |

(Continued)

FOREIGN PATENT DOCUMENTS

| JP | 2011-138149 A | 7/2011 |
| JP | 2014-008682 A | 1/2014 |

(Continued)

OTHER PUBLICATIONS

JP Office Action for JP Application No. 2022-167490, mailed on Oct. 31, 2023 with English Translation.
(Continued)

*Primary Examiner* — Naresh Vig
(74) *Attorney, Agent, or Firm* — Sughrue Mion, PLLC

(57) ABSTRACT

An image processing unit (110) acquires a position of an advertisement and a position of a product by analyzing an image in which the product and the advertisement are disposed on a shelf rack are captured. A determination unit (120) determines whether or not a relation between the position of the product and the position of the advertisement satisfies a criterion. An output unit (130) outputs information indicating a determination result obtained by the determination unit (120).

9 Claims, 9 Drawing Sheets

Related U.S. Application Data continuation of application No. 16/651,675, filed as application No. PCT/JP2018/029188 on Aug. 3, 2018, now Pat. No. 11,308,516.

(51) Int. Cl.
  *G06Q 30/0242* (2023.01)
  *G06Q 30/0272* (2023.01)
  *G06T 7/70* (2017.01)

(56) References Cited

U.S. PATENT DOCUMENTS

| | | | | |
|---|---|---|---|---|
| 2015/0262116 A1* | 9/2015 | Katircioglu | ......... | G06Q 10/087 705/28 |
| 2016/0063519 A1 | 3/2016 | Bao | | |
| 2016/0292628 A1* | 10/2016 | Nagamatsu | ......... | G06Q 10/087 |
| 2017/0178226 A1 | 6/2017 | Graham | ............. | G06Q 10/087 |
| 2017/0278056 A1 | 9/2017 | Itou et al. | | |
| 2017/0337508 A1* | 11/2017 | Bogolea | ............... | G06Q 10/087 |
| 2018/0060804 A1* | 3/2018 | Cheruku | ............... | G06Q 20/203 |
| 2019/0197561 A1* | 6/2019 | Adato | ...................... | G06T 7/73 |

FOREIGN PATENT DOCUMENTS

| | | |
|---|---|---|
| JP | 2016-048409 A | 4/2016 |
| WO | 2016/052379 A1 | 4/2016 |
| WO | 2016/052382 A1 | 4/2016 |
| WO | 2016/052383 A1 | 4/2016 |

OTHER PUBLICATIONS

International Search Report for PCT/JP2018/029188, dated Oct. 30, 2018.
What is Amazon Rekognition, Nov. 30, 2016, Amazon (Year: 2016).

* cited by examiner

INFORMATION PROCESSING APPARATUS, INFORMATION PROCESSING METHOD, AND PROGRAM FOR IDENTIFYING WHETHER AN ADVERTISEMENT IS POSITIONED IN ASSOCIATION WITH A PRODUCT

CROSS-REFERENCE TO RELATED APPLICATIONS

The present application is a continuation application of U.S. patent application Ser. No. 17/693,529 filed on Mar. 14, 2022, which is a continuation application of U.S. patent application Ser. No. 16/651,675 filed on Mar. 27, 2020, which issued as U.S. Pat. No. 11,308,516, which is a National Stage Entry of international application PCT/JP2018/029188 filed on Aug. 3, 2018, which claims the benefit of priority from Japanese Patent Application 2017-191792 filed on Sep. 29, 2017, the disclosures of all of which are incorporated in their entirety by reference herein.

TECHNICAL FIELD

The present invention relates to a technology for analyzing an advertisement used by a store or the like.

BACKGROUND ART

In a retail store such as a supermarket, a convenience store, or a drug store, one of the factors influencing the sales of the store is an advertisement (Point of purchase advertising: POP advertisement) installed on a display shelf or the like.

It should be noted that, Patent Document 1 to Patent Document 3 disclose examples of a technology of checking whether or not a work of displaying a product is correctly performed. Patent Document 1 discloses a technology of preparing association information indicating a correspondence relation between product information and an electronic shelf label, in advance, and determining whether or not a correspondence relation between a product and an electronic shelf label, which is determined based on the position of the product and the position of the electronic shelf label in an image, coincides with the correspondence relation in the association information. Patent Document 2 discloses a technology of generating association information in which the nearest product and the nearest electronic shelf label are associated with each other, based on the position of the product and the position of the electronic shelf label in an image and transmitting product information to the electronic shelf label on the basis of the association information. Patent Document 3 discloses a technology of determining whether or not an error is present in a relation between the number of types of products recognized from an image and the number of shelf labels or in a relation between the position of the product of each type recognized from the image and the position of the shelf label recognized from the image.

RELATED DOCUMENT

Patent Document

[Patent Document 1] International Publication No. WO2016/052379
[Patent Document 2] International Publication No. WO2016/052382
[Patent Document 3] International Publication No. WO2016/052383

SUMMARY OF THE INVENTION

Technical Problem

In order to sufficiently exhibit the effect of the advertisement, it is necessary to dispose the advertisement as defined. However, a work of checking whether the advertisement is disposed on a shelf rack or the like as defined has been performed manually.

The present invention has been made in view of the above problems. One object of the present invention is to save labor of checking whether an advertisement is disposed on a shelf rack or the like as defined.

Solution to Problem

According to the present invention, an information processing apparatus includes an image processing unit that acquires a position of an advertisement and a position of a product by analyzing an image in which the product and the advertisement are disposed on a shelf rack are captured, a determination unit that determines whether or not a relation between the position of the product and the position of the advertisement satisfies a criterion, and an output unit that outputs information indicating a determination result obtained by the determination unit.

According to the present invention, an information processing method executed by a computer includes acquiring a position of an advertisement associated with a product and a position of the product by analyzing an image in which the product and the advertisement are disposed on a shelf rack are captured, determining whether or not a relation between the position of the product and the position of the advertisement satisfies a criterion, and outputting information indicating the determination result.

According to the present invention, a program causes a computer to perform processing of a control method of the present invention.

Advantageous Effects of Invention

According to the present invention, it is possible to save labor of checking whether an advertisement is disposed on a shelf rack or the like as defined.

BRIEF DESCRIPTION OF THE DRAWINGS

The above-described and other objects, features and advantages will become more apparent from the preferred example embodiments described below and the accompanying drawings.

DESCRIPTION OF EMBODIMENTS

First Example Embodiment

[Functional Configuration]

Figure 1:
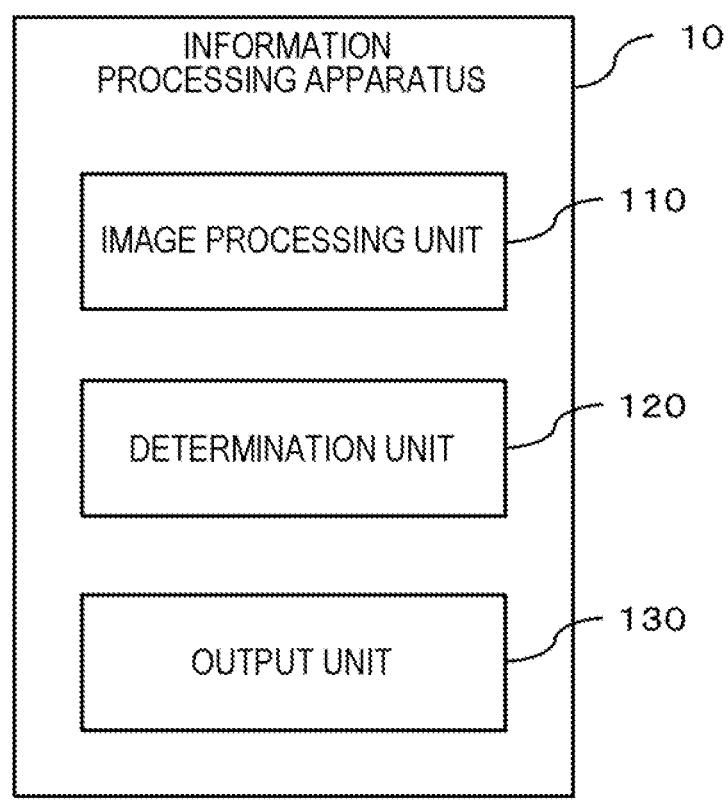
FIG. 1 is a block diagram conceptually illustrating a functional configuration of an information processing apparatus according to a first example embodiment.

FIG. 1 is a block diagram conceptually illustrating a functional configuration of an information processing apparatus 10 according to a first example embodiment. As illustrated in FIG. 1, the information processing apparatus 10 in the present example embodiment includes an image processing unit 110, a determination unit 120, and an output unit 130. For example, the information processing apparatus 10 refers to a portable information processing apparatus such as a smartphone or a tablet, but the example embodiment is not limited thereto. For example, the information processing apparatus 10 may be a server apparatus. In this case, the information processing apparatus 10 acquires "an image in which a product and an advertisement are disposed on a shelf rack are captured" (described later) from a portable terminal such as a smartphone or a tablet, and transmits a result of processing (described later) performed with the image, to the portable terminal.

The image processing unit 110 acquires a position of an advertisement and a position of a product by analyzing an image in which the product and the advertisement are disposed on a shelf rack are captured. The determination unit 120 determines whether or not a relation between the position of the product and the position of the advertisement satisfies a criterion. The output unit 130 outputs information indicating a determination result obtained by the determination unit 120.

[Hardware Configuration]

Each functional constituent unit of the information processing apparatus 10 may be realized by hardware (for example, hard-wired electronic circuit or the like) that realizes each functional constituent unit, or may be realized by a combination of hardware and software (for example, combination of an electronic circuit and a program for controlling the electronic circuit). A case where each functional constituent unit of the information processing apparatus 10 is realized by a combination of hardware and software will be further described below.

Various computers are provided as a computer 1000. For example, the computer 1000 is a personal computer (PC), a server machine, a tablet terminal, or a smartphone. The computer 1000 may be a dedicated computer designed for realizing the information processing apparatus 10 or may be a general-purpose computer.

Figure 2:
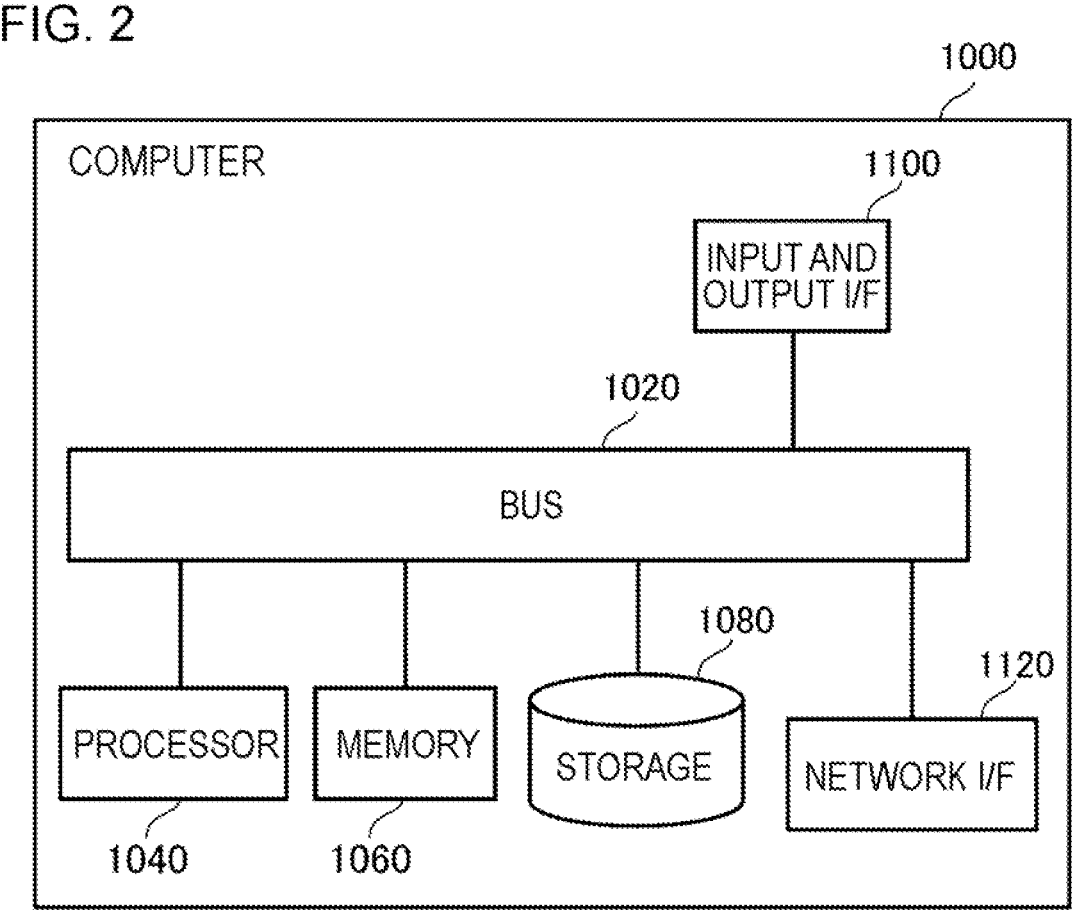
FIG. 2 is a diagram illustrating a configuration of a computer that realizes the information processing apparatus.

FIG. 2 is a diagram illustrating a configuration of the computer 1000 that realizes the information processing apparatus 10. The computer 1000 includes a bus 1020, a processor 1040, a memory 1060, a storage device 1080, an input and output interface 1100, and a network interface 1120. The bus 1020 is a data transmission path for causing the processor 1040, the memory 1060, the storage device 1080, the input and output interface 1100, and the network interface 1120 to transmit and receive data to and from each other. A method of connecting the processor 1040 and the like to each other is not limited to a bus connection. The processor 1040 is a processor configured with a central processing unit (CPU), a graphics processing unit (GPU), and the like. The memory 1060 is a main storage configured with a random access memory (RAM) and the like. The storage device 1080 is an auxiliary storage configured with a hard disk drive (HDD), a solid state drive (SSD), a memory card, a read only memory (ROM), or the like.

The input and output interface 1100 is an interface for connecting the computer 1000 and input and output devices to each other. For example, an input device such as a keyboard or an output device such as a display device is connected to the input and output interface 1100.

The network interface 1120 is an interface for connecting the computer 1000 to a network. The network is a local area network (LAN) or a wide area network (WAN), for example. A method of connecting the network interface 1120 to the network may be a wireless connection or a wired connection.

The storage device 1080 stores program modules for implementing the functions (image processing unit 110, determination unit 120, and output unit 130) of the information processing apparatus 10. The processor 1040 executes each program module to realize the function corresponding to the program module.

According to the present example embodiment, the determination unit 120 determines whether or not the position of an advertisement when the position of a product is used as a basis satisfies a criterion. Thus, it is possible to save labor of checking whether an advertisement is disposed on a shelf rack or the like as defined.

Second Example Embodiment

[Functional Configuration]

Figure 3:
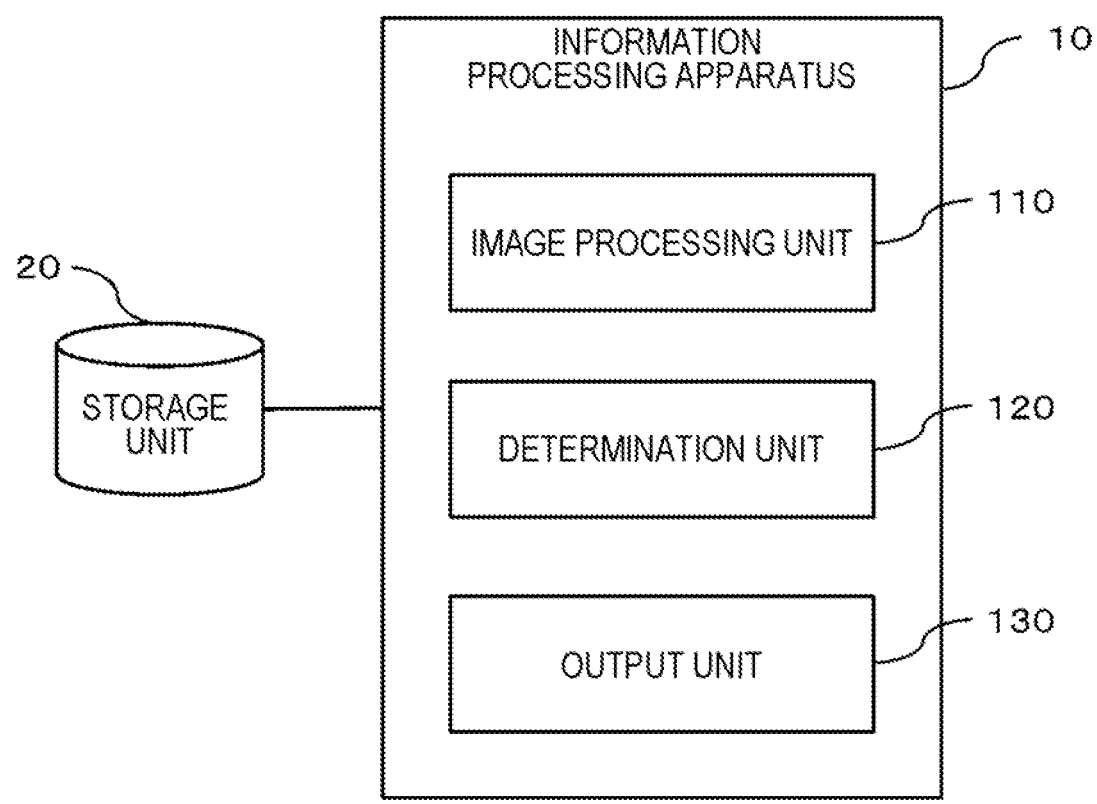
FIG. 3 is a block diagram conceptually illustrating a functional configuration of an information processing apparatus according to a second example embodiment.

FIG. 3 is a block diagram conceptually illustrating a functional configuration of an information processing apparatus 10 according to a second example embodiment. As illustrated in FIG. 3, the information processing apparatus 10 in the present example embodiment has a configuration similar to that of the information processing apparatus 10 according to the first example embodiment except for communicating with a storage unit 20. In the example illustrated in FIG. 3, the storage unit 20 is a memory or a storage and is provided outside of the information processing apparatus 10. The storage unit 20 may be mounted in the information processing apparatus 10.

The storage unit 20 stores a criterion used when the determination unit 120 performs determination, for each type of product, each product, each type of advertisement, or each advertisement. Plural types of POP advertisements are provided. As an example, the POP advertisement includes a type disposed on the front of a display shelf in a transverse direction, a type disposed on a post of a display shelf rack in a vertical direction, and a type disposed above a display shelf. For example, the storage unit 20 stores the criterion used when the determination unit 120 performs determination, along with information (advertisement type information) indicating the type. The storage unit 20 may store the criterion for each POP advertisement (for each piece of advertisement identification information). For example, the POP advertisement may be prepared in a unit including plural types of products such as "food" and "household items". A POP advertisement dedicated for a specific product may be prepared. The storage unit 20 may store a criterion used when the determination unit 120 performs determination, along with information (product type information) indicating the type of the product. The storage unit 20 may store the criterion for each product (each piece of product identification information). It should be noted that, the criterion used here varies depending on the type of advertisement, the type of product, or the like. Specific examples thereof will be described later with reference to FIGS. 5 to 7.

The storage unit 20 also stores various types of information used in image processing. For example, the storage unit 20 stores information (for example, feature value) required for determining a product by image processing, in association with product identification information for identifying the product. The storage unit 20 stores information (for example, feature value) required for determining an advertisement by image processing, in association with advertisement identification information for identifying the advertisement. The storage unit 20 may store a feature value for identifying the type of advertisement, for each type of advertisement (each piece of advertisement type information). The storage unit 20 further stores advertisement type information corresponding to advertisement identification information and identification information of a product (product identification information) as a target of the advertisement, in association with the advertisement identification information. It should be noted that, the advertisement identification information may include information for determining the type of advertisement.

Operation Examples

Figure 4:
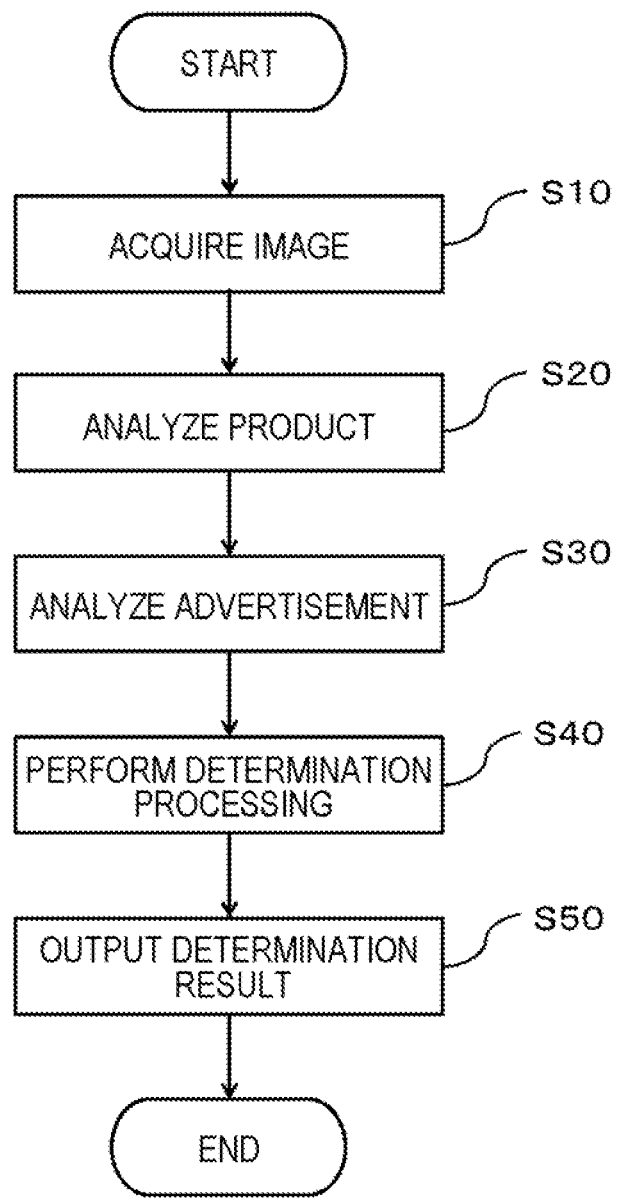
FIG. 4 is a flowchart illustrating a flow of processing performed by the information processing apparatus in the second example embodiment.

FIG. 4 is a flowchart illustrating a flow of processing performed by the information processing apparatus 10 in the second example embodiment. Firstly, the image processing unit 110 in the information processing apparatus 10 acquires an image to be processed (S10). The image is an image generated by imaging a display shelf rack. In a case where the information processing apparatus 10 includes an imaging unit, the image may be generated by the imaging unit. The image may be generated by an external imaging apparatus outside of the information processing apparatus 10. In the latter case, the image may be transmitted from the imaging apparatus to the information processing apparatus 10 or may be transmitted to the information processing apparatus 10 through a storage.

Then, the image processing unit 110 determines the position of a product by analyzing the acquired image (S20). An example of analysis processing performed here is matching processing of a feature value. The position determined in the analysis includes both a position in a height direction and a position in a horizontal direction. In the determination, the image processing unit 110 may further determine the type of product with information stored in the storage unit 20. The image processing unit 110 may further determine information regarding the product with information stored in the storage unit 20. Here, the information regarding the product may include at least any of types of information such as a product name, an identifier (Japanese article number (JAN) code or the like), the name (for example, brand name) of a group to which the product belongs, a product category to which the product belongs, a content (for example, 350 ml) of the product, the size of the product, and a standard price and a maker (manufacturer or sales maker) of each product.

Then, the image processing unit 110 determines the position of an advertisement by analyzing the acquired image (S30). An example of analysis processing performed here is matching processing of a feature value. The position determined in the analysis also includes both a position in a height direction and a position in a horizontal direction. In the determination, the image processing unit 110 further determines the type of advertisement (advertisement identification information) or a product (product identification information) as a target of the advertisement, using information stored in the storage unit 20. The image processing unit 110 may determine the type of advertisement with information stored in the storage unit 20.

Then, the determination unit 120 determines whether or not the position of the advertisement when the position of the product is used as a basis satisfies a criterion, using an analysis result of the image processing unit 110 and information stored in the storage unit 20 (S40). Specifically, the determination unit 120 reads a criterion associated with advertisement identification information determined by the image processing unit 110 or a criterion associated with advertisement type information determined by the image processing unit 110. The determination unit 120 determines whether or not a relation between the position of the product and the position of the advertisement, which are determined by the image processing unit 110 satisfies the read criterion.

The output unit 130 outputs a determination result obtained by the determination unit 120 (S50). Here, the output means, for example, that the determination result is output to a display apparatus included in the information processing apparatus 10. In the output, the output unit 130 may output an image in which information (for example, border line or arrow) for recognizing an advertisement which does not satisfies the criterion is superimposed on the image acquired by the image processing unit 110. It should be noted that, the output unit 130 may transmit the determination result to the server or the storage unit 20, so as to cause the server or the storage unit 20 to store the determination result. It should be noted that, the output unit 130 may perform the output only in a case where the criterion is not satisfied or may also perform the output in a case where the criterion is satisfied.

It should be noted that, preferably, the determination unit 120 determines product identification information corresponding to the advertisement identification information determined by the image processing unit 110, using information stored in the storage unit 20. In this case, the determination unit 120 preferably uses the position of a product corresponding to the determined product identification information, in the position of the product, which is determined by the image processing unit 110, for the above-described determination. In other words, the determination unit 120 preferably uses the position of the advertisement and the position of the product as the target of the advertisement, for the determination. It should be noted that, the determination unit 120 may determine whether or not the product identification information of the product as the target of the determination coincides with the product identification information corresponding to the advertisement identification information determined by the image processing unit 110, instead of the above processing.

Figure 5:
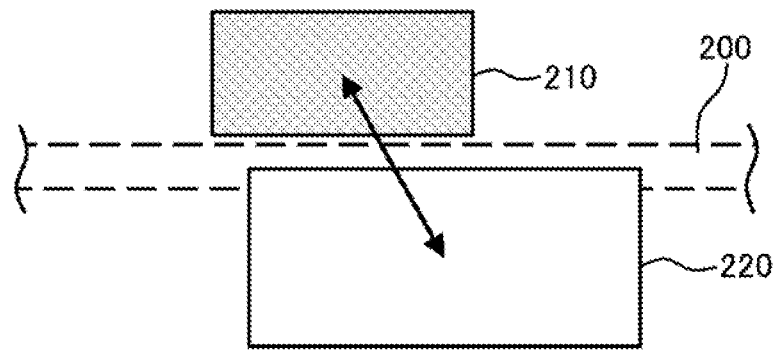
FIG. 5 is a diagram illustrating a first example of a criterion used in a determination unit.

FIG. 5 is a diagram illustrating a first example of the criterion used in the determination unit 120. In the example illustrated in FIG. 5, a product 210 is disposed on a display shelf rack 200, and an advertisement 220 is attached to the front of the display shelf rack 200. The criterion used by the determination unit 120 is a distance between the product 210 and the advertisement 220 (for example, a distance between the center of the product 210 and the center of the advertisement 220). In a case where the distance is equal to or smaller than a criterion value, the determination unit 120 determines that the advertisement is disposed at a correct position. In a case where the distance exceeds the criterion value, the determination unit 120 determines that the advertisement is disposed at an incorrect position.

Figure 6:
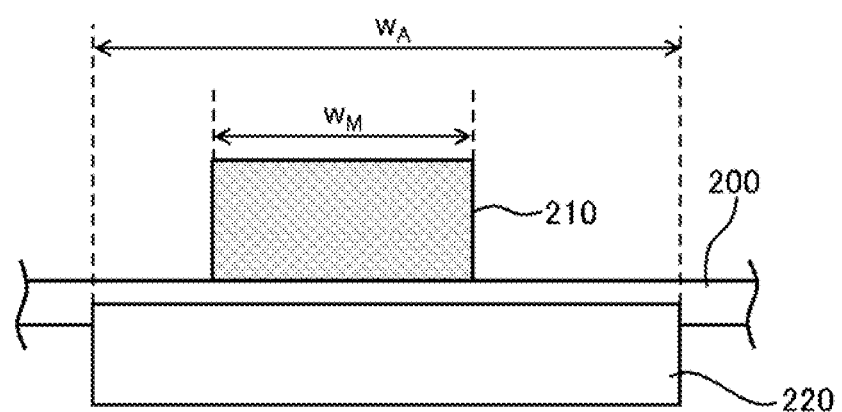
FIG. 6 is a diagram illustrating a second example of the criterion used in the determination unit.

FIG. 6 is a diagram illustrating a second example of the criterion used in the determination unit 120. In the example illustrated in FIG. 6, the positions of the product 210 and the advertisement 220 are identical to those in the first example. Therefore, the advertisement 220 extends in a width direction. The criterion used by the determination unit 120 means, for example, whether or not a one-dimensional position of the product 210 in a width direction of an image acquired by the image processing unit overlaps a one-dimensional position of the advertisement 220 in the width direction of the same image. Specifically, the determination unit 120 determines whether or not an area indicated by $w_M$ in FIG. 6 (one-dimensional position of the product 210 in the width direction of the image) overlaps an area indicated by $w_A$ in FIG. 6 (one-dimensional position of the advertisement 220 in the width direction of the image). In a case where the areas overlap at least partially each other, the determination unit 120 determines that the advertisement is disposed at a correct position. In a case where the areas do not overlap each other, the determination unit 120 determines that the advertisement is disposed at an incorrect position.

Figure 7:
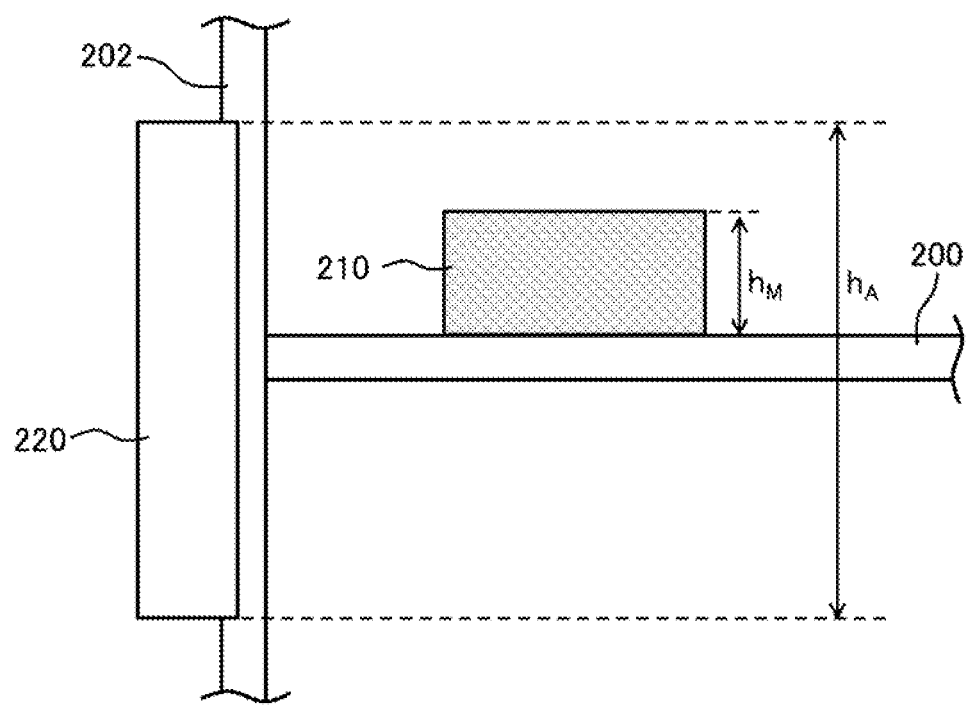
FIG. 7 is a diagram illustrating a third example of the criterion used in the determination unit.

FIG. 7 is a diagram illustrating a third example of the criterion used in the determination unit 120. In the example illustrated in FIG. 7, the advertisement 220 extends vertically (in a height direction) along the post of the display shelf rack 200. The criterion used by the determination unit 120 means, for example, whether or not a one-dimensional position of the product 210 in a height direction of an image acquired by the image processing unit overlaps a one-dimensional position of the advertisement 220 in the height direction of the same image. Specifically, the determination unit 120 determines whether or not an area indicated by h M in FIG. 7 (one-dimensional position of the product 210 in the height direction of the image) overlaps an area indicated by h A in FIG. 7 (one-dimensional position of the advertisement 220 in the height direction of the image). In a case where the areas overlap at least partially each other, the determination unit 120 determines that the advertisement is disposed at a correct position. In a case where the areas do not overlap each other, the determination unit 120 determines that the advertisement is disposed at an incorrect position.

The criterion used by the determination unit 120 is not limited to the examples illustrated in FIGS. 5 to 7. For example, in a case where the number of advertisements required on one shelf is specified, the image processing unit 110 may determine the number of advertisements per one shelf, and the determination unit 120 may determine whether or not the determined number satisfies the specified number. The image processing unit 110 may determine an inclination of the advertisement. In this case, the determination unit 120 may determine whether or not the inclination exceeds a predetermined value.

In the examples illustrated in FIGS. 5 to 7, the product 210 is placed on the display shelf rack 200, but the product 210 may be placed on a wagon. In this case, for example, the criterion illustrated in FIG. 5 may be used.

It should be noted that, in a case where the storage unit 20 stores information indicating a position (second criterion, for example, position in which a specific position of a product shelf rack is used as a basis) at which the advertisement is to be disposed, the determination unit 120 may determine whether or not the position of the advertisement is disposed at a correct position. In a case where the storage unit 20 stores an image of a display shelf rack to which an advertisement corresponding to advertisement identification information is attached, in association with the advertisement identification information, a degree of coincidence (score) between the image of the display shelf rack and the image acquired by the image processing unit 110 may be computed, and it may be determined whether or not the degree of coincidence is equal to or more than a criterion value. In any case, the output unit 130 outputs the determination result.

The determination unit 120 may determine whether or not the advertisement is posted in an accurate period. In this case, the output unit 130 also outputs the determination result. For example, the storage unit 20 stores a period in which the advertisement is to be posted, in association with advertisement identification information. The image processing unit 110 acquires information indicating date and time on which an image to be processed is captured, along with the image. The determination unit 120 determines whether or not the date and time acquired by the image processing unit 110 are included in the period stored by the storage unit 20. It should be noted that, the output unit 130 may perform the output only in a case of being out of the period.

As described above, in the present example embodiment, the determination unit 120 also determines whether or not the position of an advertisement when the position of a product is used as a basis satisfies a criterion. Thus, it is possible to save labor of checking whether an advertisement is disposed on a shelf rack or the like as defined.

Third Example Embodiment

Figure 8:
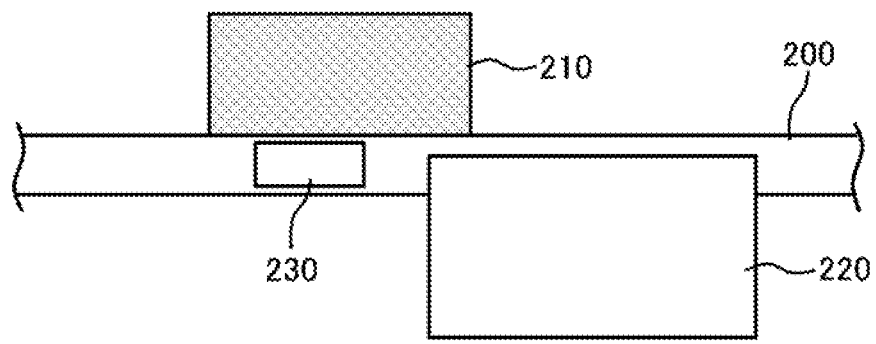
FIG. 8 is a diagram illustrating processing performed by an information processing apparatus according to a third example embodiment.

FIG. 8 is a diagram illustrating processing performed by an information processing apparatus 10 according to a third example embodiment. In the present example embodiment, the information processing apparatus 10 performs processing as follows, in addition to the processing described in the second example embodiment.

Firstly, a shelf label 230 is attached to the display shelf rack 200. The image processing unit 110 determines the position of the shelf label 230. At this time, the image processing unit 110 determines a product as a target of the shelf label 230 in image processing. The image processing used here is, for example, character recognition processing, but may be processing of reading a code (for example, a barcode or a two-dimensional code) included in the shelf label 230. The image processing unit 110 determines product determination information of the product. The product determination information is not particularly limited. For example, the product determination information includes the name of a product, which is acquired by character recognition processing, product identification information read from a code (JAN code or the like), an image feature value that can be extracted from an image area recognized as a product in image processing.

The determination unit 120 determines whether or not product identification information of the product as the target of the advertisement 220 coincides with product identification information in the shelf label 230 nearest to the advertisement 220. The output unit 130 outputs the determination result. It should be noted that, the output unit 130 may perform the output only in a case where the pieces of information do not coincide with each other.

As described above, in the present example embodiment, the determination unit 120 also determines whether or not the position of an advertisement when the position of a product is used as a basis satisfies a criterion. Thus, it is possible to save labor of checking whether an advertisement is disposed on a shelf rack or the like as defined. The determination unit 120 further determines whether or not the product as the target of the shelf label coincides with the product as the target of the advertisement. Thus, it is possible to further save labor of checking whether an advertisement is disposed on a shelf rack or the like as defined.

Fourth Example Embodiment

Figure 9:
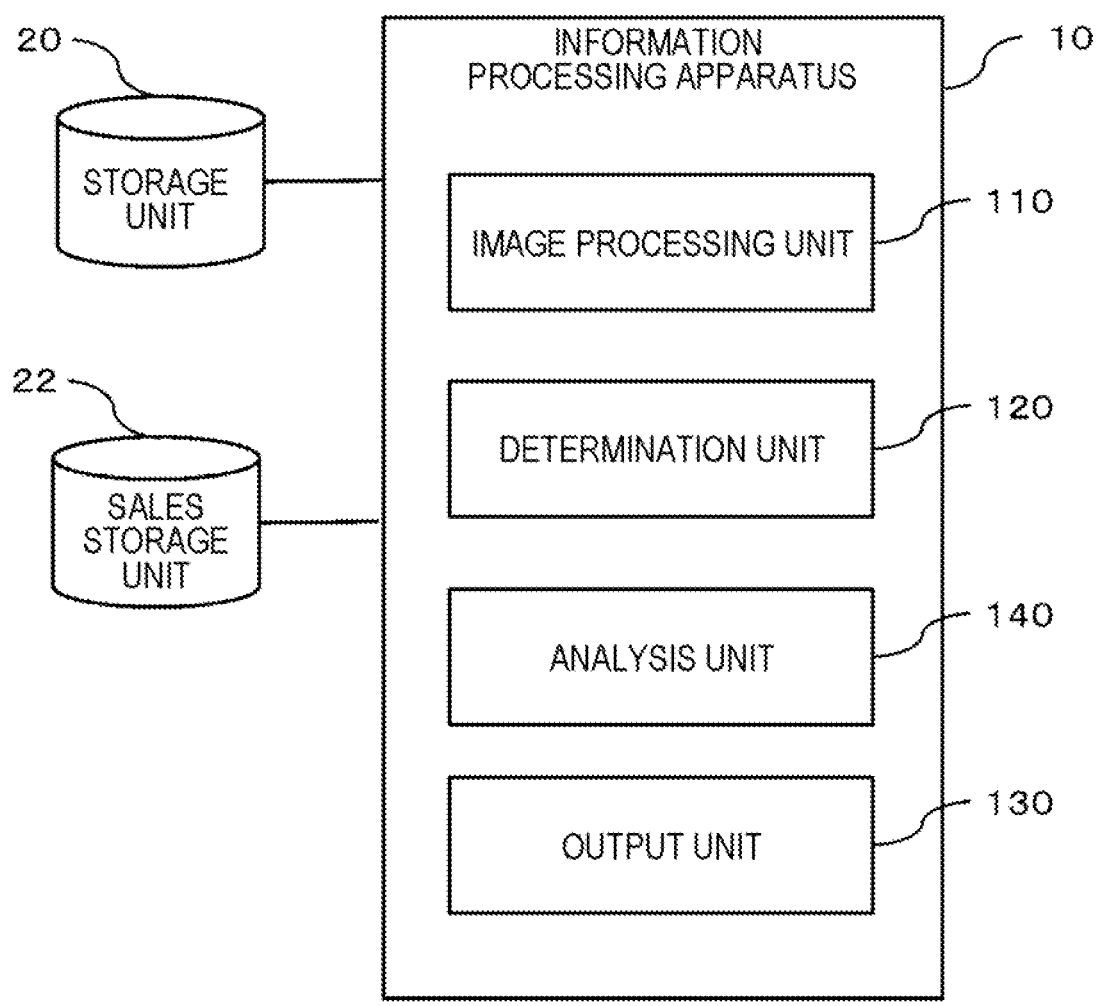
FIG. 9 is a block diagram conceptually illustrating a functional configuration of an information processing apparatus according to a fourth example embodiment.

FIG. 9 is a block diagram conceptually illustrating a functional configuration of an information processing apparatus 10 according to a fourth example embodiment. In the present example embodiment, the information processing apparatus 10 has a configuration similar to the configuration of the information processing apparatus 10 according to the second example embodiment or the third example embodiment except that information stored by a sales storage unit 22 can be read, and an analysis unit 140 is provided.

The sales storage unit 22 stores sales data in a store providing the advertisement 220. The data may be summed up as sales data for each product identification information and for each period.

The storage unit 20 stores information indicating a period in which an advertisement is posted, for each advertisement, in association with product determination information as a target of the advertisement. Further, the storage unit 20 stores information indicating whether or not the position of the advertisement satisfies the criterion, in order words, information indicating a determination result obtained by the determination unit 120, for each advertisement.

The analysis unit 140 generates information indicating a relation between the determination result obtained by the determination unit 120 for a certain advertisement and sales of the product on the date and time on which the advertisement is posted. For example, the analysis unit 140 reads a period in which a certain advertisement is provided, and product determination information of a product as a target of the advertisement, by using information stored in the storage unit 20. The analysis unit 140 computes the summed value of sales corresponding to the read product determination information in the read period and associates the computation result with the information indicating the determination result obtained by the determination unit 120. The output unit 130 outputs the summed value and the information indicating a determination result obtained by the determination unit 120.

As described above, in the present example embodiment, the determination unit 120 also determines whether or not the position of an advertisement when the position of a product is used as a basis satisfies a criterion. Thus, it is possible to save labor of checking whether an advertisement is disposed on a shelf rack or the like as defined. The output unit 130 outputs the sales in the period in which the advertisement is posted and information (determination result obtained by the determination unit 120) indicating whether or not the advertisement is correctly posted. Therefore, it is possible to verify a sales promotion effect by an advertisement with high accuracy.

Hitherto, the example embodiments of the present invention are described with reference to the drawings, but the example embodiments are examples of the present invention. Various configurations other than the above description may be adopted.

Some or all of the above example embodiments may be described as in the following supplementary notes, but are not limited to the followings.

1. An information processing apparatus including:
   an image processing unit that acquires a position of an advertisement and a position of a product by analyzing an image in which the product and the advertisement are disposed on a shelf rack are captured;
   a determination unit that determines whether or not a relation between the position of the product and the position of the advertisement satisfies a criterion; and
   an output unit that outputs information indicating a determination result obtained by the determination unit.

2. The information processing apparatus described in 1.,
   in which the determination unit reads the criterion from a storage unit that stores the criterion for each type of the product, each product, each type of the advertisement, or each advertisement.

3. The information processing apparatus described in 1. or 2.,
   in which the criterion indicates a distance between the product and the advertisement.

4. The information processing apparatus described in 1. or 2.,
   in which the shelf rack includes a plurality of tiers, and the determination unit determines whether or not a one-dimensional position of the product in a height direction of the image overlaps a one-dimensional position of the advertisement in the height direction of the image, or whether or not a one-dimensional position of the product in a width direction of the image overlaps a one-dimensional position of the advertisement in the width direction of the image.

5. The information processing apparatus described in any one of 1. to 4.,
   in which the image processing unit determines a type of the product and a type of a product as a target of the advertisement, by analyzing the image, and
   the determination unit determines whether or not the type of the product and the type of the product as the target of the advertisement, which are determined by the image processing unit, coincide with each other, in addition to the determination of the criterion.

6. The information processing apparatus described in any one of 1. to 5.,
   in which the image processing unit further determines a position of a shelf label provided on the shelf rack and a type of a product as a target of the shelf label, and
   the determination unit determines whether or not a type of a product as a target of the advertisement coincides with a type of a product as a target of a shelf label nearest to the advertisement.

7. The information processing apparatus described in any one of 1. to 6.,
   in which the determination unit determines whether or not the position of the advertisement satisfies a second criterion different from the criterion.

8. The information processing apparatus described in any one of 1. to 7.,
   in which the determination unit reads a period in which the advertisement is to be posted for each type of the advertisement, from a storage unit that stores the period, and determines whether or not date and time on which the image is captured is included in the period.

9. The information processing apparatus described in any one of 1. to 8. further including:
   an analysis unit that generates information indicating a relation between a determination result obtained by the determination unit and sales of the product in a period in which the advertisement is posted, in which the output unit outputs the information generated by the analysis unit.

10. An information processing method executed by a computer, the method including:

acquiring a position of an advertisement associated with a product and a position of the product by analyzing an image in which the product and the advertisement are disposed on a shelf rack are captured;

determining whether or not a relation between the position of the product and the position of the advertisement satisfies a criterion; and outputting information indicating the determination result.

11. The information processing method executed by a computer described in 10., in which plural types of advertisements are provided, the method including reading the criterion from a storage unit that stores the criterion for each type of the product, each product, each type of the advertisement, or each advertisement.

12. The information processing method executed by a computer described in 10. or 11., in which the criterion indicates a distance between the product and the advertisement.

13. The information processing method executed by a computer described in 10. or 11., in which the shelf rack includes a plurality of tiers, the method including:

determining whether or not a one-dimensional position of the product in a height direction of the image overlaps a one-dimensional position of the advertisement in the height direction of the image, or whether or not a one-dimensional position of the product in a width direction of the image overlaps a one-dimensional position of the advertisement in the width direction of the image.

14. The information processing method executed by a computer described in any one of 10. to 13., the method further including:

determining a type of the product and a type of a product as a target of the advertisement, by analyzing the image, and determining whether or not the determined type of the product coincides with the type of the product as a target of the advertisement, in addition to the determination of the criterion.

15. The information processing method executed by a computer described in any one of 10. to 14., the method further including:

determining a position of a shelf label provided on the shelf rack and a type of a product as a target of the shelf label, and determining whether or not a type of a product as a target of the advertisement coincides with a type of a product as a target of a shelf label nearest to the advertisement.

16. The information processing method executed by a computer described in any one of 10. to 15., the method further including:

determining whether or not the position of the advertisement satisfies a second criterion different from the criterion.

17. The information processing method executed by a computer described in any one of 10. to 16., the method further including:

reading a period in which the advertisement is to be posted for each type of the advertisement, from a storage unit that stores the period, and determining whether or not date and time on which the image is captured is included in the period.

18. The information processing method executed by a computer described in any one of 10. to 17., the method further including:

generating information indicating a relation between the determination result and sales of the product in a period in which the advertisement is posted, and outputting the generated information.

19. A program causing a computer to perform the information processing method according to any one of 10. to 18.

The invention claimed is:

1. An information processing apparatus comprising:
at least one memory configured to store instructions; and
at least one processor configured to execute the instructions to perform operations comprising:
  acquiring an image of a shelf rack;
  based on analysis of the image, determining first positional information indicating a position for each advertisement on the shelf rack and second positional information indicating a position for each product on the shelf rack;
  identifying, as for each advertisement, a corresponding shelf label based on the first positional information and second positional information;
  determining, for each set of an advertisement and a corresponding product, whether first product identification information of a product related to the advertisement and second product identification information of the corresponding product are identical;
  in response to determining that the first product identification information and the second product identification information are not identical, obtaining an updated image by superimposing, on the image, a border line and/or an arrow indicating the advertisement associated with the first product identification information that does not satisfy a relationship with the second product identification information; and
  outputting the updated image.

2. The information processing apparatus according to claim 1, wherein, as for each advertisement, a product with the closest distance from the advertisement is identified as the corresponding product for the advertisement.

3. The information processing apparatus according to claim 1, wherein the arrow is output on the image.

4. An information processing method executed by a computer, the method comprising:
acquiring an image of a shelf rack;
based on analysis of the image, determining first positional information indicating a position for each advertisement on the shelf rack and second positional information indicating a position for each product on the shelf rack;
identifying, as for each advertisement, a corresponding product based on the first positional information and second positional information;
determining, for each set of an advertisement and a corresponding product, whether first product identification information of a product related to the advertisement and second product identification information of the corresponding product are identical;
in response to determining that the first product identification information and the second product identification information are not identical, obtaining an updated image by superimposing, on the image, a border line and/or an arrow indicating the advertisement associated with the first product identification information that does not satisfy a relationship with the second product identification information; and outputting the updated image.

5. The information processing method according to claim 4, wherein, as for each advertisement, a product with the closest distance from the advertisement is identified as the corresponding product for the advertisement.

6. The information processing method according to claim 4, wherein the arrow is output on the image.

7. A non-transitory computer readable medium storing a program causing a computer to execute operations comprising:

acquiring an image of a shelf rack;

based on analysis of the image, determining first positional information indicating a position for each advertisement on the shelf rack and second positional information indicating a position for each product on the shelf rack;

identifying, as for each advertisement, a corresponding product based on the first positional information and second positional information;

determining, for each set of an advertisement and a corresponding product, whether first product identification information of a product related to the advertisement and second product identification information of the corresponding product are identical;

in response to determining that the first product identification information and the second product identification information are not identical, obtaining an updated image by superimposing, on the image, a border line and/or an arrow indicating the advertisement associated with the first product identification information that does not satisfy a relationship with the second product identification information; and outputting the updated image.

8. The non-transitory computer readable medium according to claim 7, wherein, as for each advertisement, a product with the closest distance from the advertisement is identified as the corresponding product for the advertisement.

9. The non-transitory computer readable medium according to claim 7, wherein the arrow is output on the image.

\* \* \* \* \*